UNITED STATES PATENT OFFICE.

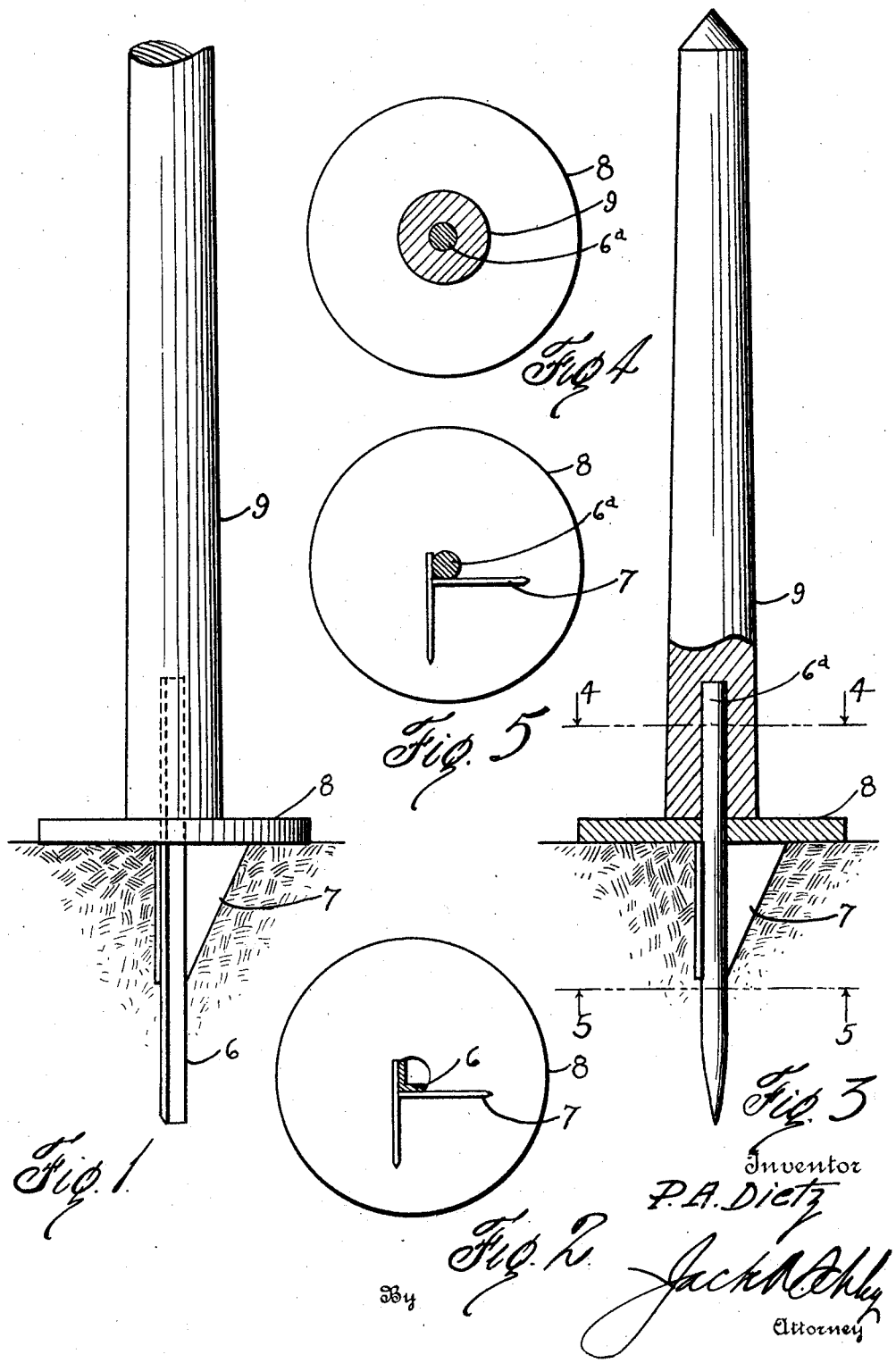

PAUL A. DIETZ, OF FORT WORTH, TEXAS.

POST STRUCTURE.

1,360,623.  Specification of Letters Patent.  Patented Nov. 30, 1920.

Application filed October 25, 1919. Serial No. 333,366.

*To all whom it may concern:*

Be it known that I, PAUL A. DIETZ, citizen of the United States, residing at Fort Worth, in the county of Tarrant and State of Texas, have invented certain new and useful Improvements in Post Structures, of which the following is a specification.

This invention relates to new and useful improvements in post structures.

The object of the invention is to provide a base support for a post whereby the post is held in position and fastened in a simple manner. Another feature is, that by the use of this structure an ordinary wooden post will last a much longer time and will also retain its alinement.

In carrying out the invention a base plate of suitable material is placed on the ground. An anchoring rod driven into the ground projects up through the center of the plate and extends above the same. The upwardly projecting end of the rod is received in the bottom of the post which rests on the plate, thus sustaining the post.

The invention will be more readily understood from a reading of the following specification and by reference to the accompanying drawings, in which an example of the invention is shown, and wherein:

Figure 1 is a elevation of a post structure,

Fig. 2 is an underside view of the same,

Fig. 3 is a sectional view of a modified form of structure,

Fig. 4 is a cross-sectional view on the line 4—4 of Fig. 3, and

Fig. 5 is a cross-sectional view on the line 5—5 of Fig. 3.

In the drawings the numeral 6 designates a vertically disposed stake which may be inserted into the ground by any suitable means, said stake being reinforced by means of laterally extending leaves 7, the tops of the latter being flush with the top of the ground, and the upper portion of the stake protruding above the level of the ground to a suitable height. The reinforcing leaves 7 have their outer edges inclined and these leaves taper downwardly, while their large upper ends are substantially horizontal, and contact with the plate 8. The stake extends forwardly or downwardly beyond the reduced ends of the leaves, as shown. These leaves are arranged at a right angle to each other.

It will be noted that Fig. 1 shows an angle iron stake 6 and that Fig. 3 shows a round stake 6ª. Either of these forms may be used in this structure with equally satisfacory results.

A horizontal circular plate 8 having an aperture in the center of same of a suitable size to permit the stake to protrude through the said plate is placed on the ground in such a manner as to lie flat on the ground with the stake protruding upwardly through the aperture in the center of said plate. It is pointed out, however, that the applicant is not limited to a circular plate but may use a flat plate of any shape.

A post 9 is mounted on the top of the stake 6 in such a manner as to rest on the plate 8, the latter forming a base for the post and extending away from the post to a sufficient distance to shield the post from coming in contact with vegetation growing from the ground adjacent the bottom of the post. It is obvious that the plate would protect the post from deterioration caused by coming in contact with the ground or vegetation growing out of the ground, and thereby prolong the life of the post and enable a common wooden post to be used a much longer time that if the bottom of said post was exposed to the soil. It is further noted that this construction may be adapted to a post of any size or height, and is very simple and substantial.

What I claim is:

1. In a post structure, a substantially vertical stake, reinforcing leaves extending longitudinally of the stake with the stake projecting upwardly beyond the leaves, said leaves being tapered and decreasing in width downwardly, an apertured plate receiving the upper portion of the stake and contacting with the leaves, and a post having an opening in its lower end to receive the upper end of the stake and arranged upon the plate.

2. In a post structure, a substantially vertical stake, reinforcing leaves extending longitudinally of the stake with the stake projecting upwardly and downwardly beyond the same, said leaves being angularly arranged with relation to each other and tapered longitudinally and decreasing in width downwardly, the enlarged upper ends of the leaves being substantially horizontal, an apertured plate to receive the upper end of the stake and to contact with the upper substantially horizontal ends of the leaves, and a post having an opening in its lower end to receive the upper end of the stake and contacting with the plate.

In testimony whereof I affix my signature.

PAUL A. DIETZ.